United States Patent
Wiseman

(10) Patent No.: US 11,115,462 B2
(45) Date of Patent: Sep. 7, 2021

(54) DISTRIBUTED SYSTEM

(71) Applicant: BRITISH TELECOMMUNICATIONS PUBLIC LIMITED COMPANY, London (GB)

(72) Inventor: Richard Michael Wiseman, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 14/763,997

(22) PCT Filed: Jan. 28, 2014

(86) PCT No.: PCT/GB2014/000029
§ 371 (c)(1),
(2) Date: Jul. 28, 2015

(87) PCT Pub. No.: WO2014/114906
PCT Pub. Date: Jul. 31, 2014

(65) Prior Publication Data
US 2015/0358397 A1 Dec. 10, 2015

(30) Foreign Application Priority Data
Jan. 28, 2013 (EP) .................... 13250012

(51) Int. Cl.
*H04L 29/08* (2006.01)
*G06F 16/955* (2019.01)
*G06F 40/134* (2020.01)

(52) U.S. Cl.
CPC .......... *H04L 67/10* (2013.01); *G06F 16/9566* (2019.01); *G06F 40/134* (2020.01); *H04L 67/02* (2013.01)

(58) Field of Classification Search
CPC ..... H04L 67/10; H04L 67/02; G06F 17/2235; G06F 17/30887
See application file for complete search history.

(56) References Cited

U.S. PATENT DOCUMENTS 6,253,204 B1 * 6/2001 Glass .................. G06F 16/9566
6,594,697 B1 * 7/2003 Praitis .................. G06F 11/327
707/E17.119

(Continued)

FOREIGN PATENT DOCUMENTS

EP 2 587 743 5/2013
EP 2 587 743 A1 5/2013

(Continued)

OTHER PUBLICATIONS

International Search Report for PCT/GB2014/000029, dated Mar. 6, 2014, 4 pages.

(Continued)

*Primary Examiner* — Philip J Chea
*Assistant Examiner* — Wuji Chen
(74) *Attorney, Agent, or Firm* — Nixon & Vanderhye P.C.

(57) ABSTRACT

A distributed system is disclosed in which one or more servers respond to requests for content including hyperlinks. Hyperlinks provide an interactive visual manifestation of an underlying reference to a resource. By using a graphical user interface provided by the device, a user is able to select a hyperlink, and thereby control the device to obtain the resource to which the underlying reference refers. However, if a user selects a hyperlink and the device is unable to follow the underlying reference to obtain the resource, user disappointment results. By arranging the server, on providing visual content including one or more hyperlinks, to attempt (212) to follow the references underlying the hyperlinks, and to alter (216) the appearance of any hyperlink for which the underlying reference could not be followed, users (Continued)

are alerted to the likelihood that selecting the hyperlink will not lead to them obtaining the resource. In this way, user disappointment is avoided. The technique is of particular utility to web-site administrators.

9 Claims, 14 Drawing Sheets

(56) References Cited

U.S. PATENT DOCUMENTS

| | | | |
|---|---|---|---|
| 6,601,066 B1* | 7/2003 | Davis-Hall | G06F 16/958 |
| 8,079,087 B1* | 12/2011 | Spies | G06F 21/51 |
| | | | 726/26 |
| 8,639,806 B2* | 1/2014 | Gawor | H04L 41/5074 |
| | | | 709/203 |
| 8,984,640 B1* | 3/2015 | Emigh | H04L 63/1441 |
| | | | 726/13 |
| 9,075,777 B1* | 7/2015 | Pope | G06F 17/2235 |
| 2003/0145046 A1* | 7/2003 | Keller | H04L 29/06 |
| | | | 709/203 |
| 2003/0158953 A1* | 8/2003 | Lal | H04L 29/06 |
| | | | 709/230 |
| 2004/0024848 A1 | 2/2004 | Smith et al. | |
| 2004/0107267 A1* | 6/2004 | Donker | G06F 16/9566 |
| | | | 709/218 |
| 2005/0055569 A1* | 3/2005 | Shipp | G06F 16/9566 |
| | | | 726/4 |
| 2005/0223082 A1 | 10/2005 | Sankaran et al. | |
| 2006/0101334 A1 | 5/2006 | Liao et al. | |
| 2008/0010368 A1* | 1/2008 | Hubbard | G06F 17/30864 |
| | | | 709/223 |
| 2008/0028284 A1* | 1/2008 | Chen | G06F 17/2745 |
| | | | 715/205 |
| 2008/0120533 A1 | 5/2008 | Lazier et al. | |
| 2008/0155389 A1* | 6/2008 | Suh | G06F 16/9577 |
| | | | 715/207 |
| 2008/0172738 A1* | 7/2008 | Bates | G06F 21/64 |
| | | | 726/22 |
| 2009/0132524 A1* | 5/2009 | Stouffer | G06F 17/30864 |
| 2009/0248494 A1 | 10/2009 | Hueter et al. | |
| 2011/0153631 A1* | 6/2011 | Kondasani | G06F 16/9566 |
| | | | 707/758 |
| 2012/0304292 A1* | 11/2012 | Liu | H04L 61/30 |
| | | | 726/22 |
| 2013/0055395 A1* | 2/2013 | Milener | G06F 21/51 |
| | | | 726/24 |
| 2014/0173417 A1* | 6/2014 | He | G06F 16/986 |
| | | | 715/234 |
| 2016/0006749 A1* | 1/2016 | Cohen | G06F 16/285 |
| | | | 726/23 |
| 2017/0208026 A1* | 7/2017 | Boehler | H04L 51/18 |

FOREIGN PATENT DOCUMENTS

| | | |
|---|---|---|
| WO | 01/63878 A1* | 8/2001 |
| WO | WO 01/63878 | 8/2001 |
| WO | 2005/071568 A1 | 8/2005 |
| WO | 2008/031117 A2 | 3/2008 |

OTHER PUBLICATIONS

Written Opinion of the ISA for PCT/GB2014/000029, dated Mar. 6, 2014, 6 pages.
Link Alarm—The Automatic Link Check Tool (print of web-page at www.linkalarm.com downloaded on Oct. 17, 2012) (2 pgs.)
"Displaying broken URLs with indicators in web browsers", Research Disclosure, Mason Publications, Hampshire, GB, vol. 504, No. 33, Apr. 1, 2006 (4 pgs.)
Examination Report dated Feb. 3, 2021 for GB application No. GB1513068.5 (3 pages).
Examination Report dated Sep. 18, 2020 issued in GB application No. GB1513068.5 (6 pgs.).

* cited by examiner

| URL Status Response | Status Code |
|---|---|
| https://research.intra.bt.co.uk/demos | 200 |
| http://research.intra.bt.co.uk/capabilities | 200 |
| http://legal.intra.bt.com/legal/IP/index.htm | 404 |

Figure 7A

| URL Status Response | Status Code |
|---|---|
| http://research.intra.bt.co.uk/demos/cyclone.wmv | 200 |
| https://profile.bt.com/Person.aspx?accountname=12345678 | -2 |

Figure 7B

| URL Status Cache | | |
|---|---|---|
| URL | Status Code | Last Checked |
| http://research.intra.bt.co.uk/capabilities | 200 | 03/01/13 16:32:06 |
| http://research.intra.bt.co.uk/demos | 200 | 03/01/13 16:32:06 |
| http://legal.intra.bt.com/legal/IP/index.htm | 404 | 03/01/13 16:32:06 |
| http://research.intra.bt.co.uk/demos/cyclone.wmv | 200 | 03/01/13 16:32:14 |
| https://profile.bt.com/Person.aspx?accountname=12345678 | -2 | 03/01/13 16:32:14 |

Figure 8

| Link Alerts | | | |
|---|---|---|---|
| Impacted Page | Broken link | Availability | Certificate |
| http://research.intra.bt.co.uk/index.htm | http://legal.intra.bt.com/legal/IP/index.htm | Not Found | n/a — 180 |
| http://research.intra.bt.co.uk/demos | https://profile.bt.com/Person.aspx?accountname=12345678 | Available | Error — 182 |

Figure 9

DISTRIBUTED SYSTEM

This application is the U.S. national phase of International Application No. PCT/GB2014/000029 filed 28 Jan. 2014, which designated the U.S. and claims priority to EP Patent Application No. 13250012.5 filed 28 Jan. 2013, the entire contents of each of which are hereby incorporated by reference.

BACKGROUND AND SUMMARY

The present invention relates to a distributed system, and a method of operating a distributed system. It has particular utility in client/server systems providing users with content which is displayed with hyperlinks to other content.

A hyperlink is a user-selectable visual element, displayed on an electronic device, which is associated with an underlying reference to an electronic resource. Using a graphical user interface provided by the device, the user is able to select the hyperlink, and thereby cause the downloading of the resource to the device. A common example is a hyperlink displayed on a World-Wide Web page. In that case, the underlying reference (known as a Uniform Resource Locator (URL)) identifies a resource by identifying a host from which that resource can be obtained and the name of that resource at that host.

Systems for automatically checking the availability of web-pages addressed by hyperlinks in web-pages are known.

Many of these systems systematically run through all the links on a web-site. Some of these systems are webcrawlers run from a remote server (Link Alarm available from AVIA Consulting Inc, Northborough, Mass., USA is an example). Another proposal, set out in US Patent Application 2003/158953, discloses additional software for running on web server computers. When run, this software checks hyperlinks in pages stored by the server, and can remove those hyperlinks from the pages if it finds them to be broken.

An anonymous research disclosure entitled "Displaying broken URLs with indicators in web browsers", in Research Disclosure, Mason Publications, Hampshire, GB, vol. 504, no. 33, discloses methods of identifying broken hyperlinks in web-pages. One option taught there is to provide a plug-in at the web server that, in response to a request for a web-page, identifies all the broken links in that web-page. Having identified those broken links, it then adds extra information to the corresponding HTML page, before sending the modified page to the browser. The broken hyperlinks are then displayed using a colouring scheme making it easy for a user to identify broken URLs in the web-page.

US Patent Application 2008/120533 proposes that software might operate on a server or a client-side computer to identify and analyse third-party links and contents in web-pages to determine if third-party content still exists, is available, has changed, or disrupts a web browser.

In cases where the server carries out the identification and analysis of third-party links this is done prior to receiving a request for the content. Faulty third-party links are then removed, changed or replaced. In cases where the client-side computer carries out the identification and analysis of third-party links, the client side computer removes faulty links by dynamically changing the rendered web page before it is displayed to the user.

According to a first aspect of the present invention, there is provided a method of operating a client station in a distributed system comprising a central computer and one or more client stations, said method comprising operating each of said client stations to:
i) receive content;
ii) render said received content with hyperlinks to other content; and
iii) send at least the references underlying the displayed hyperlinks to said central computer.

By having each client station receive content, then render that content with hyperlinks to other content, and, on rendering one or more hyperlinks, send at least the references underlying the hyperlinks displayed by said client station to the central computer, the central computer is provided with a collection of references underlying the hyperlinks displayed by the one or more client stations.

According to a second aspect of the present invention, there is provided a method of operating a distributed system comprising a central computer and a plurality of client stations, said method comprising:
operating each of said client stations in accordance with the first aspect of the present invention; and
operating said central computer to receive references sent by said plurality of client stations, and to check whether the resources to which the received references refer meet one or more criteria.

By having each client station generate a of hyperlinks, then sending that list to the central computer, and operating the central computer to check the listed hyperlinks, hyperlinks generated on the client side (e.g. in personalising the content) are included in the check, whilst the benefits of collective testing of hyperlinks common to the content sent to a plurality of the client stations are maintained.

It is to be understood that 'list' is here used in its general sense, rather than referring to a special data structure used by computers.

The one or more criteria checked might include (the following list is by no means exhaustive)—the availability of the resource, whether downloading the resource might violate security restrictions placed on the client station, content ratings (e.g. whether a film's rating renders it unsuitable for viewing by the user of the client station), copyright, whether the content has changed (e.g. since it was last downloaded by this client station), the latency between one or more servers offering the hyperlinked content, the download speed from one or more servers offering the hyperlinked content, or a combination of some or all of these.

Those benefits include the protecting the privacy of the user in situations where user-specific data (e.g. cookies) is stored at the client station rather than at the central computer, and allowing the re-use of earlier checks to avoid unnecessarily repeatedly checking hyperlinks generated on the server side.

In some embodiments, the content is provided by a content provision system distinct from said central computer. In other embodiments, the content provision system comprises said central computer. The latter embodiments are beneficial because the content provision system thus carries out checks on hyperlinks in the content it serves. The results of those checks are hence returned to a computer whose administrator is in a position to take action to mitigate the impact of deficient hyperlinks (e.g. by editing the content to correct or delete the deficient hyperlink).

In either case, where the user of each client station requests a select subset of the content available from a content provision system resources of the central computer are usefully concentrated on those content items which are, in practice, provided to client stations by the content provision system.

In some embodiments, the method further comprises operating said central computer, on checking a received reference, to check whether the results of a previous check of said reference are available, and to use the results of said previous check instead of re-checking the reference.

Such caching of the results of previous checks efficiently uses the resources of the central computer without significantly comprising the accuracy of the check.

In some embodiments, the method further comprises operating said central computer, responsive to said check finding that the resource does not meet said one or more criteria, to notify said client station that said content item includes deficient hyperlinks whose underlying reference refers to a resource which fails to meet said one or more criteria; and operating said client station to receive said notification, and, in response to said notification, display the content item along with an indication of the presence of one or more hyperlink faults in said content item.

By operating a central computer to, on the occasion of the provision of a content item including one or more hyperlinks to one or more client stations, to test one or more references associated with those hyperlinks and, in response to said test finding a problem in following the one or more references, to provide, to said client, station, in association with said content item, a notification of the presence of one or more problematic references in said content item, the client station is informed of the presence of one or more problematic references underlying hyperlinks in the content item and thereby is able to proactively alleviate or avoid the inconvenience that might otherwise be caused by the presence of hyperlinks whose underlying references are problematic in the content item.

The notification may be a general indication of the presence of one or more problematic references underlying hyperlinks in the content item, or it may identify each of one or more problematic references, or it may identify each of one or more hyperlinks whose underlying reference is problematic. By displaying the content item with an indication of the presence of one or more faulty hyperlinks in said content item, the resource wastage and user frustration resulting from the user of the client station attempting to follow a faulty hyperlink is alleviated or avoided.

In some embodiments, the content provision system alters the content item to include an indication of the presence of one or more hyperlink faults in the content item, and only after that alteration is made, does it provide the content item to the client station.

In other embodiments, the content item is sent to the client station in response to a client request for a content item, and is later replaced with a version of the content item altered to include an indication of one or more hyperlink faults within it. This avoids delay in providing the content item to the client station, which might otherwise be introduced were the content provision system to check the references underlying hyperlinks included in the content before providing the content item to the client station, but it does introduce a need to replace the original content item with the altered content item.

There are at least two different ways of replacing the original content item with the altered content item.

In some embodiments, the content item is altered by the content provision system to include the notification. The client station is then arranged to automatically request a refresh of the content item at one or more subsequent times (the refresh providing the altered content item once that altered content item has been generated by the content provision system).

In other embodiments, the content item is altered by the client station in reaction to the receipt of a separate notification. In these other embodiments, the content provision system provides the content item to the client station prior to testing the references underlying hyperlinks in the content item, and thereafter sends the notification of the presence of one or more problematic references to the client station; in the meantime, the client station displays the content item, subsequently receives the notification, and, in response to said notification, alters the display of the content item to include the indication of the presence of one or more faulty hyperlinks in the content item. In distributed systems where the client stations outnumber the content provision systems, this has the benefit of distributing the computational burden of adapting the display of the content item amongst the numerous client stations.

In some embodiments, the method further comprises operating the central computer, responsive to the check finding a problem with following one or more of said underlying references, to log the problem.

By logging problems at the central computer, a straightforward method of aggregating the results of tests carried out on references underlying hyperlinks in content items actually served by the content provision system is provided.

In cases where the central computer serves the content (i.e. where the central computer is the content provisioning system), this is especially advantageous because it provides the administrator of the content with notice of problematic references underlying hyperlinks in the content—thus informing the person who is in a position to correct the problem, or have the problem corrected (e.g. by removing the hyperlink, or modifying the underlying reference, or providing a resource at the destination of the reference).

According to a third aspect of the present invention, there is provided a method of operating a content provision system, said method comprising providing a content item to one of more client stations, presentation of said content item involving the display of one or more hyperlinks, said content item including mobile code executable by the client station, on the occasion of the presentation of said content item, to send at least the references underlying said one or more hyperlinks to a central computer.

This provides a way of enabling the client station to carry out those steps without having to install software on the client station.

In some embodiments, the mobile code includes a call to hyperlink checking software executable on said central computer to perform said steps of checking whether the resources to which the references refer meet one or more criteria, and notifying said client station that said content item includes deficient hyperlinks whose underlying reference refers to a resource which fails to meet said one or more criteria, said notification being provided to the working memory of the software process running said mobile code.

Where the mobile code is included within a particular piece of content (e.g. a web-page), the use of embedded code provides a method of associating the notification with the piece of content to which it relates. By including a call within code within a piece of content to a software process running on the content server, only that code will be able to handle the notification received in response to the call. Hence, only whilst the embedded code is active (the embedded code will, for example, only be active when the web-page containing the code is being displayed to the user), will the notification be handled. More broadly, by having a notification handler specific to each content item, the client station is able to associate an incoming notification with a content item.

According to a fourth aspect of the present invention, there is provided a method of operating a distributed system comprising a content server and one or more client stations, said method comprising:

operating said client station to respond to receipt of said content item by:

generating a list of hyperlinks in said content item; and providing said list to said content server in association with a request for said content server to perform said test on the hyperlinks in said list; and operating said content server to i) test the hyperlinks in said list; and responsive to said test finding a fault in said one or more hyperlinks:

ii) providing, to said client station, in association with said content item, a notification of the presence of one or more hyperlink faults in said content item; and operating said client station to receive said notification and display the content item with an indication of the presence of one or more hyperlink faults in said content item.

BRIEF DESCRIPTION OF THE DRAWINGS

There now follows, by way of example only, a description of embodiments of the present invention. This description refers to the accompanying drawings in which:

FIGS. 7A and 7B illustrate URL status response data structures given in response to the status request data structures of FIGS. 6A and 6B;

FIG. 8 illustrates the contents of a URL status cache maintained at each document server;

FIG. 9 illustrates a log of URL faults maintained at each document server;

DETAILED DESCRIPTION OF PRESENT EXAMPLE EMBODIMENTS

A wide-area computer network (FIG. 1) has two personal computers 10, 12 interconnected to a first web-site server computer 14 and a second web-site server computer 16 by a communications network 18. The first web-site server has persistent storage (for example a hard-disk), which records a suite of HTML (HyperText Markup Language) files together making up a first web-site. The second web-site server also has persistent storage (for example a hard-disk), which records a second suite of HTML files together making up a second web-site.

Figure 11:
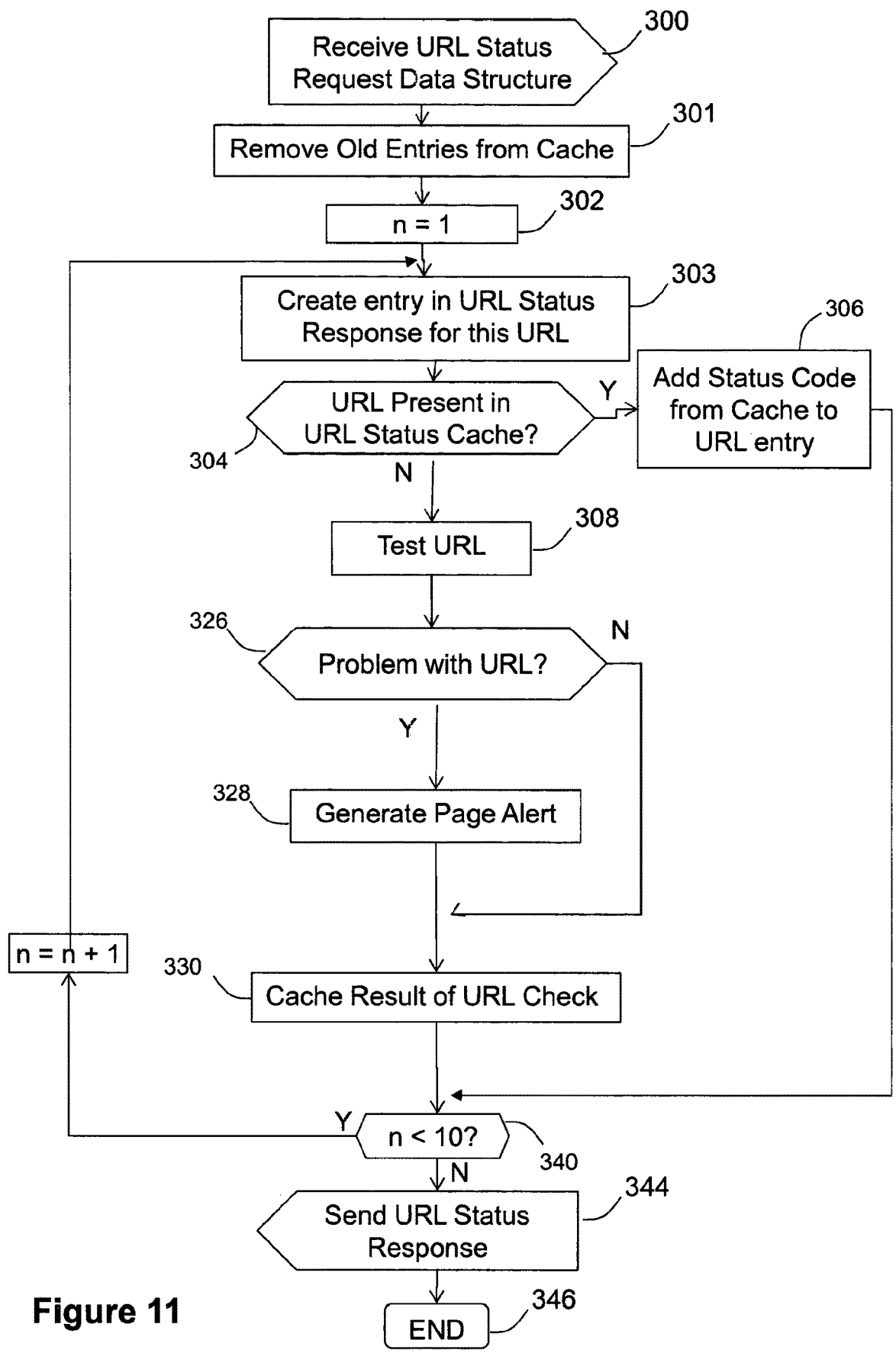
FIG. 11 is a flow-chart illustrating the URL checking and result notification performed by a document server as part of the process of FIG. 10.

A URL checking servlet, whose execution will be described in detail below with reference to FIG. 11, is loaded from CD-ROM 20 onto each of the document server computers 14,16.

A JavaScript program is loaded onto each of the web-server computers 14,16 from a CD-ROM 22. The JavaScript program is included within each of the HTML files which make up each of the web-sites. The execution of that JavaScript program by the personal computers 10, 12 will be described further with reference to FIG. 10 below.

A web browser program including a JavaScript interpreter (e.g. Internet Explorer from Microsoft Corporation), is installed on each of the personal computers 10, 12.

Each of the web server computers 14, 16 comprises (FIG. 2) a central processing unit 30, a volatile memory 32, a read-only memory (ROM) 34 containing a boot loader program, and writable persistent memory—in this case in the form of a hard disk 36. The processor 30 is able to communicate with each of these memories via a communications bus 38.

Also communicatively coupled to the central processing unit 30 via the communications bus 38 is a network interface card 40 which provides a communications interface between the web server computer 14, 16 and the communications network 18.

The hard disk 36 of each of the web server computers stores an operating system program 42, a webserver program 44, a servlet container 46 which hosts the URL checking servlet 48 loaded from the CD-ROM 20, that servlet controls the document server computer 14,16 to perform the process described in more detail below with reference to FIG. 11.

Data files stored on the hard disk 36 include:

i) HTML files 50, each of which includes, by way of a URL within the page, the JavaScript program loaded from CD-ROM 22, which is interpretable by the client computers 10, 12 to provide a hyperlink finder and a broken hyperlink highlighting tool;

ii) a URL Status Cache 52 maintained by the link checking servlet 48. The cache could take the form of a database under the control of a database management system (DBMS) program (not shown); and iii) a hyperlink fault log 54 accessible by the administrator of the document server.

The webserver—in the current implementation Apache HTTP—has the following configuration instruction.

ProxyPass/check-urls ajp://localhost:8009/LinkChecker/check-urls

As will be understood by those skilled in the art, this instruction causes the webserver 44 to react to an HTTP request on '/check-urls' by having the link checking servlet 48 handle the request. Communication between the two uses the Apache JSery Protocol.

Figure 3:
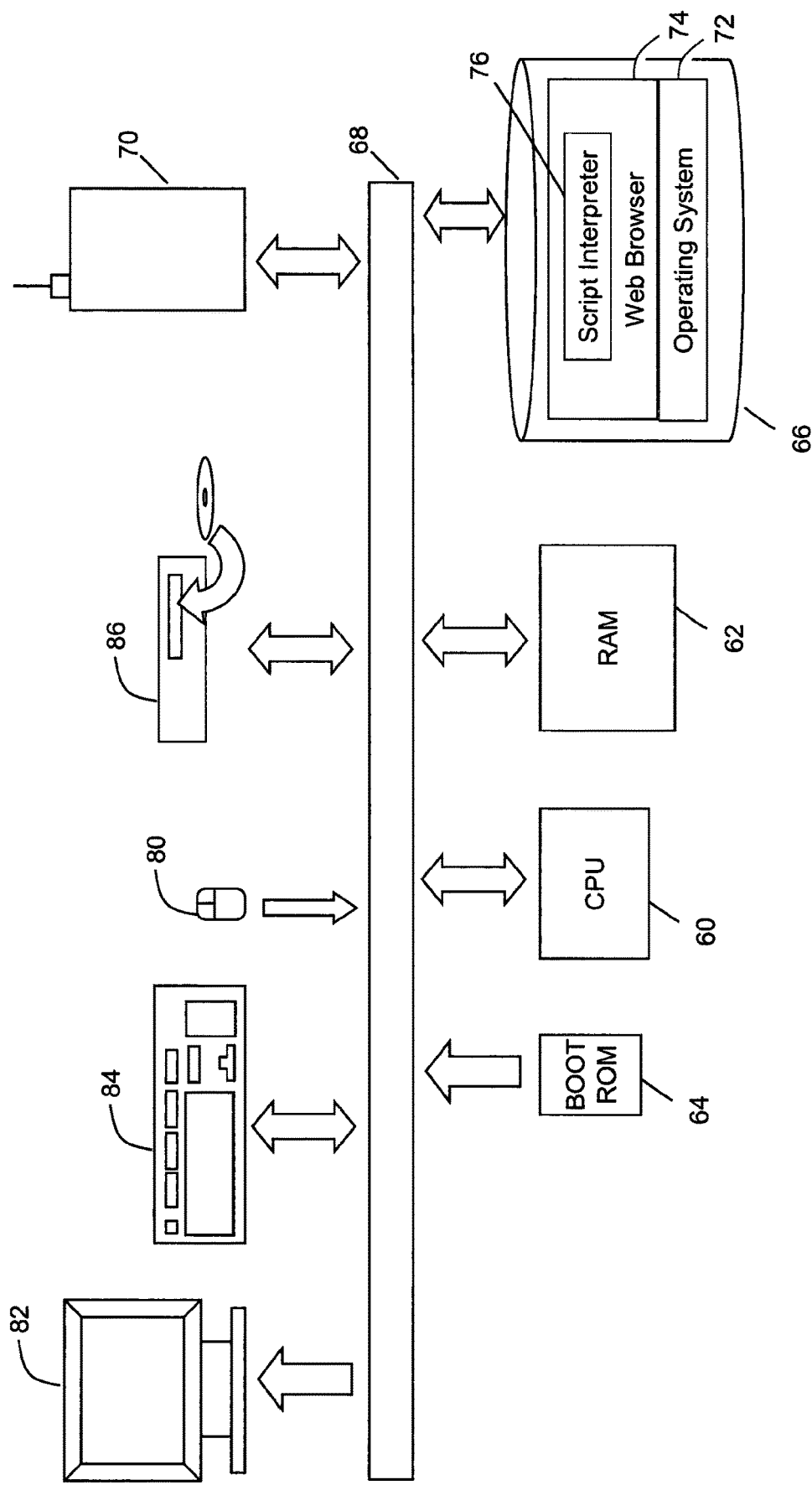
FIG. 3 illustrates the internal architecture of the personal computers.

Each of the personal computers 10, 12 has (FIG. 3), a central processing unit 60, a volatile memory 62, a read-only memory (ROM) 64 containing a boot loader program, and writable persistent memory—in this case in the form of a hard disk 66. The central processing unit 60 is able to communicate with each of these memories via a communications bus 68.

Also communicatively coupled to the central processing unit 60 via the communications bus 68 is a network interface card 70 which provides a communications interface between the personal computer 10, 12 and the communications network 18.

Figure 1:
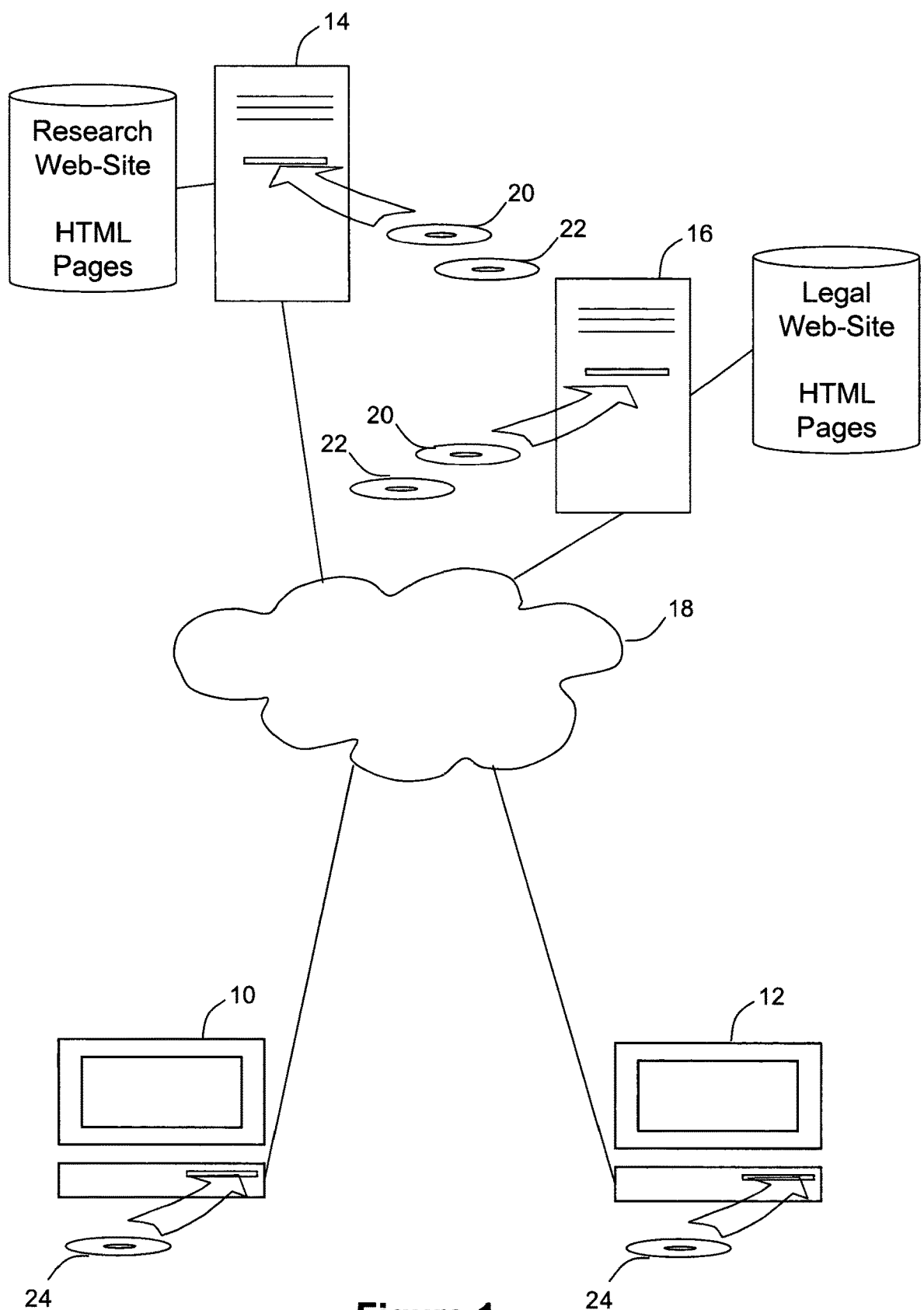
FIG. 1 illustrates a computer network in which hypertext documents are maintained and provided to users' personal computers by document server computers.

As mentioned in relation to FIG. 1, the hard disk 66 of each of the personal computers stores an operating system program 72, and a web browser 74 equipped with a script interpreter 76—in this particular example, the JavaScript interpreter supplied as part of Microsoft Internet Explorer.

Each of the personal computers further has a command input device 80 (for example a computer mouse), and a screen 82 for viewing by the user of the personal computer 10, 12, which together provide a graphical user interface between the distributed system and the user. Each of the personal computers 10, 12 also has a keyboard 84 and a CD/DVD-ROM drive 86.

It is to be noted that each of the personal computers 10, 12 in this particular embodiment, need only have conventional software and hardware. However, the delivery of a web-page supplied by one of the web server computers 14,16 via communications network 18 to the personal computer's volatile memory 62 provides the additional functionality by virtue of the JavaScript program included within the web-page. This provides the advantage that this particular embodiment can be provided without a requirement to install upgraded software on numerous personal computers (in the example of the World Wide Web a single webserver will often handle several hundred clients).

By way of example, a first HyperText MarkUp Language (HTML) file delivered by the document servers 14,16 includes HTML elements defining text and associated formatting commands (markup), along with three anchor elements. For the purposes of the present example, it will be assumed that the URL of the first HTML file is "http://research.intra.bt.co.uk/index.htm".

The first anchor element includes a Uniform Resource Locator (in this case "http://research.intra.bt.co.uk/demos"), and associated text (in this case "Demos"):
<A HREF="http://research.intra.bt.co.uk/demos">Demos</A>

The third anchor element again includes a Uniform Resource Locator (in this case "http://legal.intra.bt.co.uk/IP/index.htm"), and text (in this case "Patents"):
<A HREF="http://legal.intra.bt.co.uk/IP/index.htm">Patents</A>

Like all HTML files served by the document server computers 14,16 in this embodiment, the first HTML file further includes a script element in the head portion of the HTML file:

```
<script language = "javascript" type="text/javascript">
function url_check( ) {
......
}
</script>
``` and, within the body of the HTML file, a command that causes a URL checking process described below to be run when the page is loaded.
<body onload="url_check( )">

Figure 4:
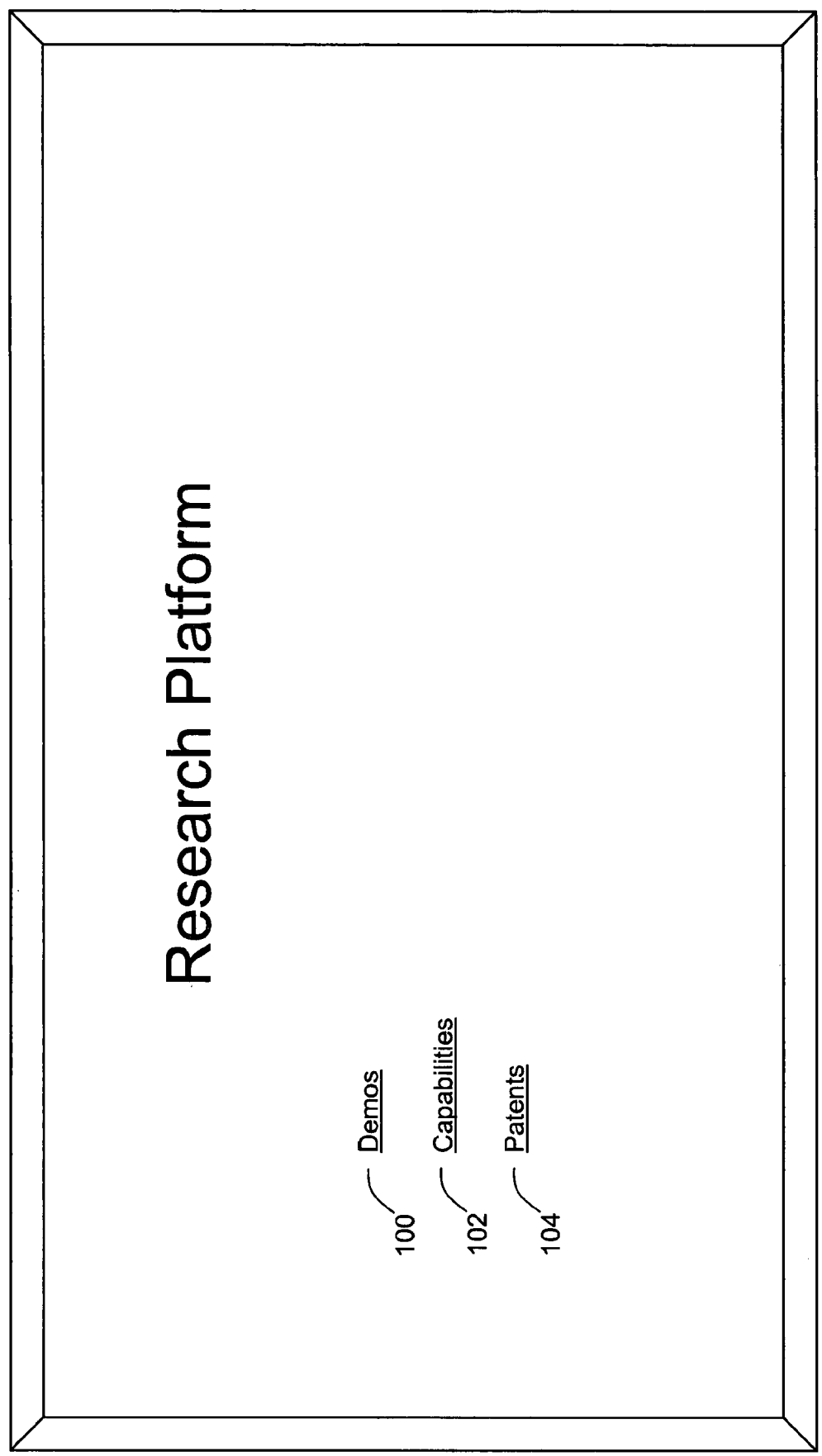
FIG. 4 illustrates a first hypertext document as displayed by one of the personal computers.

Again, by way of example, the web browser running on the personal computer 10, 12 interprets the text and formatting commands in the first HTML file to generate a display on the screen 82 of the personal computer looking like that seen in FIG. 4. If the user 'clicks' on the hyperlink 100 using the mouse 80, then the web browser program controls the personal computer to fetch the file from the location associated with the Domain Name Service (DNS) name within the URL found within the corresponding anchor element (in this case "research.intra.bt.co.uk"). In this example, the location is the first web server computer 14. By contrast, the user 'clicks' on the hyperlink 104, then the web browser program controls the personal computer to fetch the file from the location associated with the Domain Name Service (DNS) name within the URL (in this case, "legal.intra.bt-.co.uk"). In this example, the location is the second web server computer 16. Thus, it will be seen that a web-page from one web server computer can include hyperlinks which refer to web-pages (or other resources) on other web server computers.

Since the first URL refers to another. HTML file, if the user follows the hyperlink 100, the browser will download a second HTML file. It will be understood that the URL of that file will correspond to the URL found within the first hyperlink element of the first HTML file—i.e. "http://research.intra.bt.co.uk/demos". The file includes a script element in the head portion of the HTML file similar to that found in the first HTML file. The second HTML file has two anchor elements, as follows:
<A HREF="http://research.intra.bt.co.uk/demos/cyclone.wmv">Demonstration Video</A>
and
<A HREF="https://profile.bt.com/Person.aspx?accountname=12345678">Jo Bloggs</A>

Figure 10:
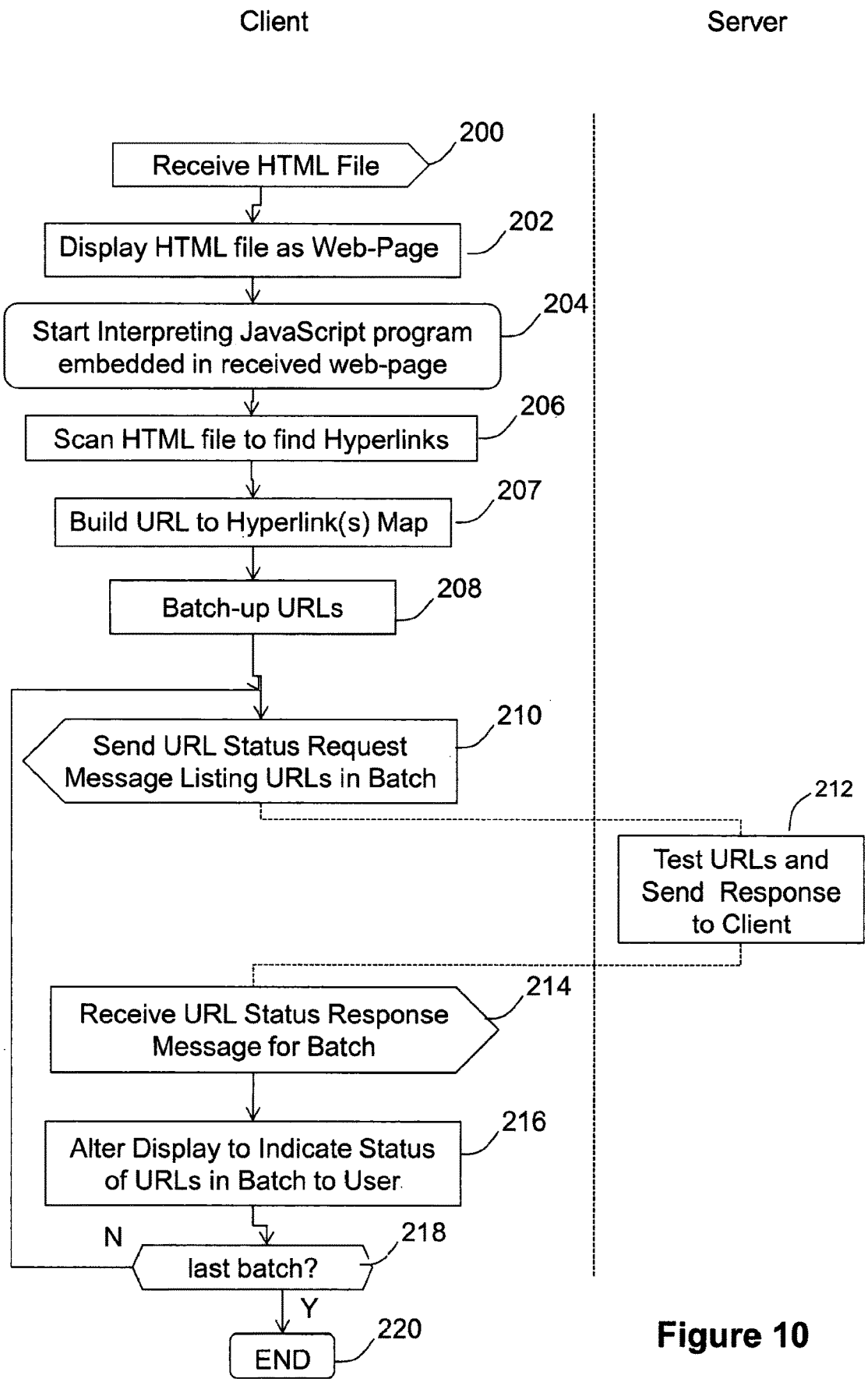
FIG. 10 is a flow-chart illustrating a distributed hyperlink checking and alerting process.

As with the first HTML file, and indeed all above HTML files served by the document servers 14, 16, the second HTML file further includes a script element which comprises instructions interpretable by a web browser program 74 running on a personal computer 10, 12 to cause the personal computer to carry out its part of the distributed process which will be described below with reference to FIGS. 10 and 11.

Figure 5:
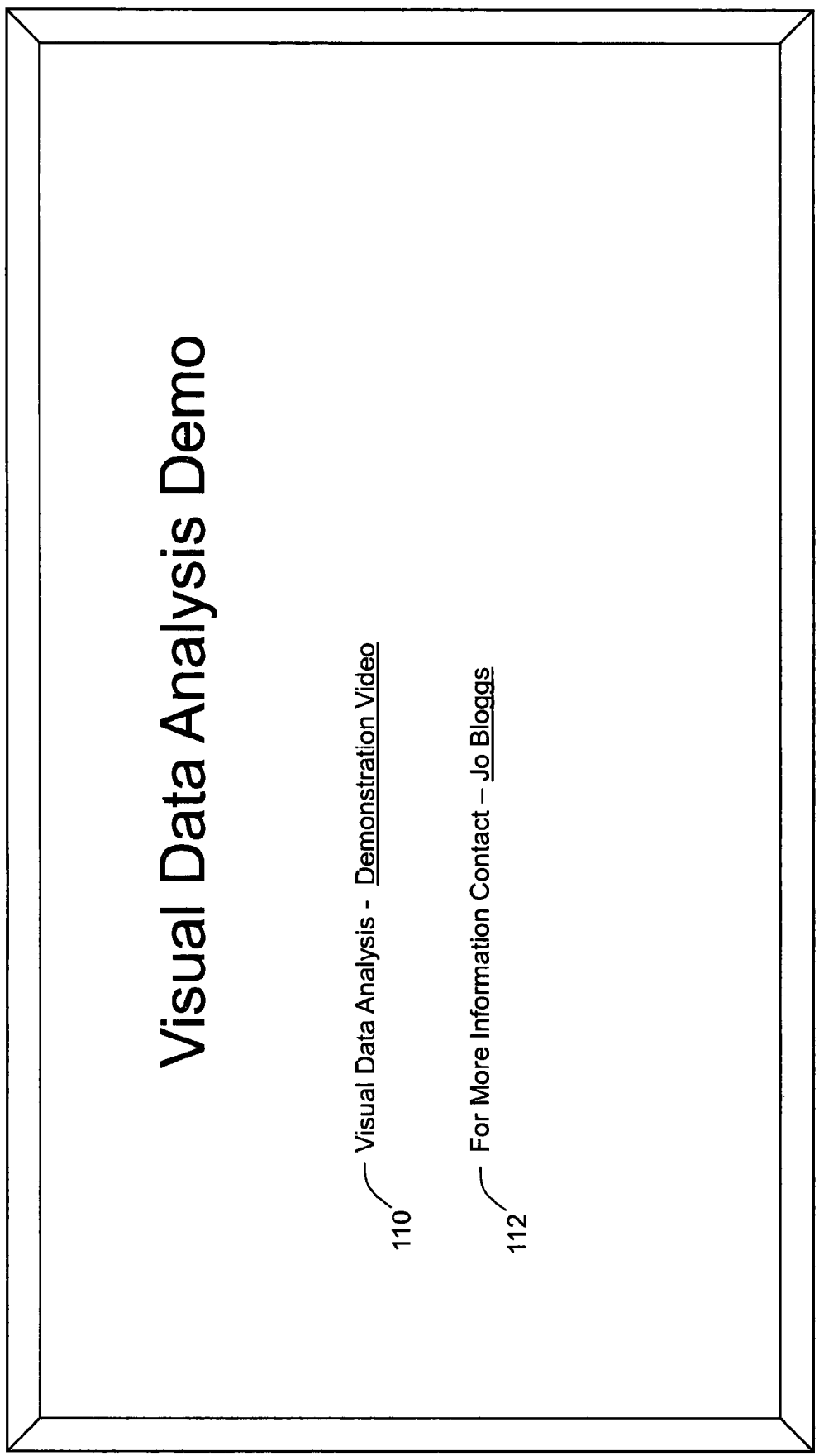
FIG. 5 illustrates a second hypertext document as displayed by one of the personal computers.

The web browser running on the personal computer then interprets the text and formatting commands in the second HTML file to generate a display on the screen 82 of the personal computer looking like that seen in FIG. 5. This second web-page includes first 110 and second 112 hyperlinks.

It is to be noted that the second hyperlink 112, the protocol used by the personal computer 10, 12 and the document server 14,16 in fetching the file is HTTPS (Hypertext Transfer Protocol Secure) instead of HTTP (Hypertext Transfer Protocol) as seen in the other four hyperlinks 100, 102, 104, and 110.

As will be understood by those skilled in the art, conventional web programs like the web browser program 74 and the webserver program 44 carry out extra security processes in order to comply with the HTTPS standard when a user clicks on a hyperlink which has an underlying Uniform Resource Locator which specifies use of the HTTPS protocol.

A URL Status Request data structure (FIG. 6A) passed from the personal computer 10,12 to the server computer on the user downloading the first HTML file (and thus seeing the display of FIG. 4) has three URLs 120, 122, 124 from the three hyperlink elements within the first HTML file.

Similarly, the URL Status Request data structure (FIG. 6B) passed from the personal computer 10,12 to the server computer on the user downloading the second HTML file (and thus seeing the display of FIG. 5) has two URLs 130, 132 from the two hyperlink elements within the second HTML file.

Figure 6A:
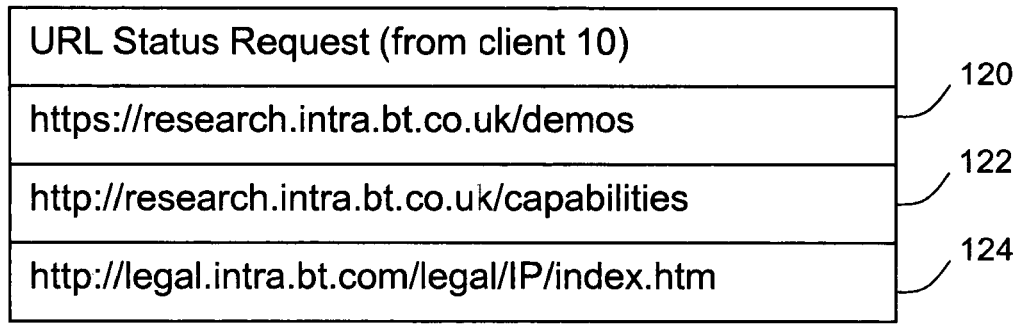
FIGS. 6A and 6B illustrate URL (Uniform Resource Locator) status request data structures.

A URL Status Response data structure (FIG. 7A) returned by the first document server 14 in reaction to receiving the data structure shown in FIG. 6A, has three entries, each of which includes a URL which has been tested, along with a Status Code 140, 142, 144 which indicates the results of that test. In many cases, the status code is the HTTP Status Code returned by the server which hosts the resource to which the URL refers. However, in some special cases, a special code is returned instead of the HTTP Status Code. In the present example, the additional special codes are:

−1: Status could not be determined;
−2: Error in site's certificate;
−3: No response from server in time period allowed.

Figure 6B:
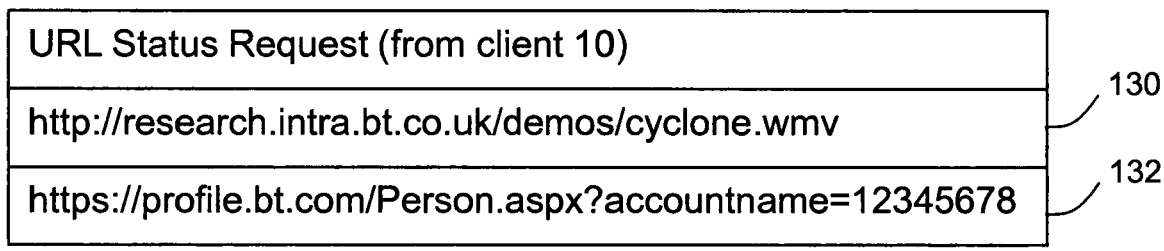

A URL Status Response data structure (FIG. 7B) returned by the first document server 14 in response to receiving the data structure shown in FIG. 6B, has two entries, each of which includes a URL which has been tested by the first document server, along with a Status Code 150, 152 as explained above.

The URL Status Cache (FIG. 2, item 52) is detailed in FIG. 8. It has an entry 160-168 for each of the URLs which the first document server 14 has tested within the last 24 hours (cache entries older than 24 days are removed each time the cache is consulted). Each entry corresponds to the information returned to the requesting personal computer 10,12, along with a timestamp which indicates the last time the link has been checked by the first document server 14. It will be understood that the second document server 16 will have a similar cache of the tests which the second document server has carried out—which will be of URLs included in hyperlinks in web-pages served by the second document server 16.

A log of faults (which might be viewable by a browser) is detailed in FIG. 9. The log of faults has an entry for each URL provided in an HTML file to a client station which has been found to contain a fault in its availability or its security. Each entry includes the URL of the HTML file which includes one or more hyperlinks including the problematic underlying URL (first column), the problematic URL (second column), an indication of whether the file identified by that URL was found to be available (third column) and where HTTPS was specified in the URL, an indication of whether the server hosting the file identified by the URL in the second column was able to provide a valid certificate when requested (fourth column). The administrator is able to delete entries from the log as and when he chooses (e.g. because he has corrected or removed the hyperlink element from the corresponding HTML file).

The process (FIG. 10) run by the personal computer on receiving 200 an HTML file, say, the first HTML file, begins with the browser rendering 202 the web-page (FIG. 4) on the screen 82 of the personal computer 10, 12. The received HTML file is arranged so that any scripts generating hyperlinks run before the url_check( ) function is called. Once all the scripts, style, HTML and images finish loading, the browser program 74 follows the onload=url_check( ) instruction in the body of the HTML file to start 204 the JavaScript url_check( ) process defined in the script element of the HTML file. The script controls the personal computer 10, 12 to scan 206 the HTML file to find all hyperlink elements and to generate 207 an associative array that has each URL as a key and each URL's corresponding value as a list of hyperlink elements that link to that URL.

In some cases, url_check( ) is called explicitly when hyperlinks are added to the page after it has loaded.

In the present example, each URL used in the HTML file has only one hyperlink element associated with it. However, in other examples, some of the URLs might have two or more hyperlinks mapped to them.

Having built 207 the associative array, the URLs listed within it are batched 208 into groups (in the current implementation batches of ten). Batching is done to ensure that results start being returned in a timely fashion (and the connection doesn't time out). In the current implementation, a batch size of 10 was chosen because this was found to balance delay-before-response and the number of required requests. For each batch of URLs, a batch-process 210-218 is carried out. Each batch process 210-218, begins with the personal computer, under control of the JavaScript program embedded within the received HTML file, sending a URL data request structure (FIGS. 6A and 6B) to document server 14,16 which provided the web-page. In the current implementation, the relevant section of the JavaScript reads:

```
new Ajax.Request(
  'check-urls',
  {
    parameters: {
      urls: urls.splice(0, URL_CHECK_BATCH_SIZE).join('\n')
    },
    onSuccess: checkedCallback, // which also calls nextBatch( )
    onFailure: nextBatch
  }
);
```

As will be understood by those skilled in the art, the creation of the AJAX Request object causes the parameters—i.e. the URL Status Request data structure (FIGS. 6A, 6B)—to be supplied to the document server 14,16 which served the HTML file. Since, in this particular example, it is the first document server 14 ("research.intra.bt.com"), and because of the 'check-uris' part of the request object, the JavaScript interpreter knows to supply those parameters in an HTTP message to the URL "research.intra.bt.com/check-urls".

Figure 2:
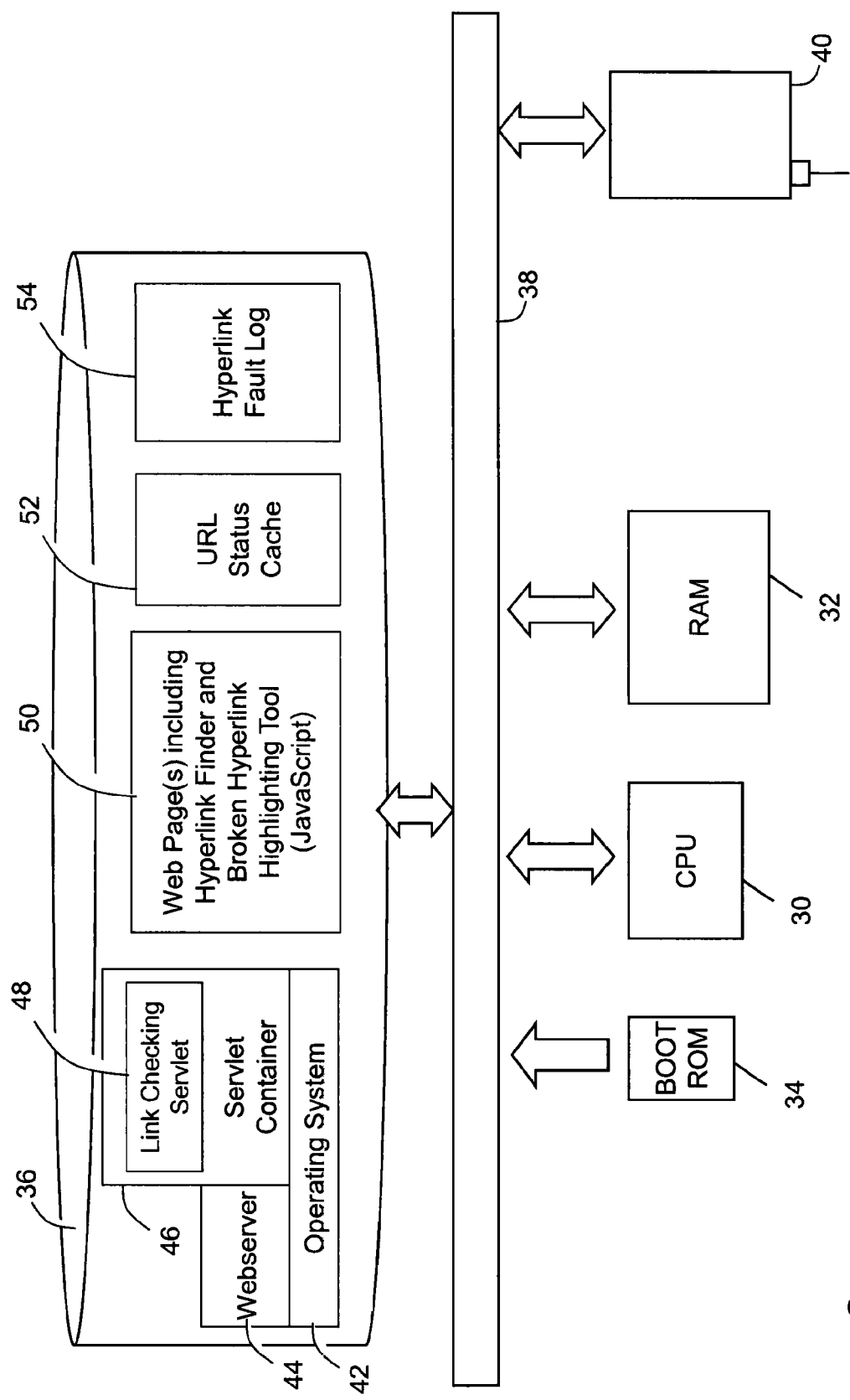
FIG. 2 illustrates the internal architecture of the document server computers.

On receiving that HTTP message, the webserver program (FIG. 2, item 44), owing to the presence of the configuration instruction mentioned in relation to FIG. 2, acts as a proxy between the personal computer 10 and the servlet container 46. On receiving the parameters, the servlet container runs the link checking servlet 48 to carry out a hyperlink check (FIG. 11).

The hyperlink check (FIG. 11), begins with the servlet receiving 300 the list of URLs in the current batch. The servlet then removes (step 301) entries more than 24 hours old (of course, other expiry time periods could be used) from the URL Status Cache (FIG. 8). A URL counter is then initialised 302, before carrying out a URL check 303-330.

The URL check 303-330 begins with the creation of an entry for the current URL in a URL Status Response data structure (FIGS. 7A and 7B) for the batch of URLs currently being processed. A test 304 follows which finds whether the current URL has an entry in the cache. If there is an entry in the cache for the current URL, then the status code from the cache (FIG. 8 middle column), is added 306 to the entry in the URL Status Response data structure.

Figure 12:
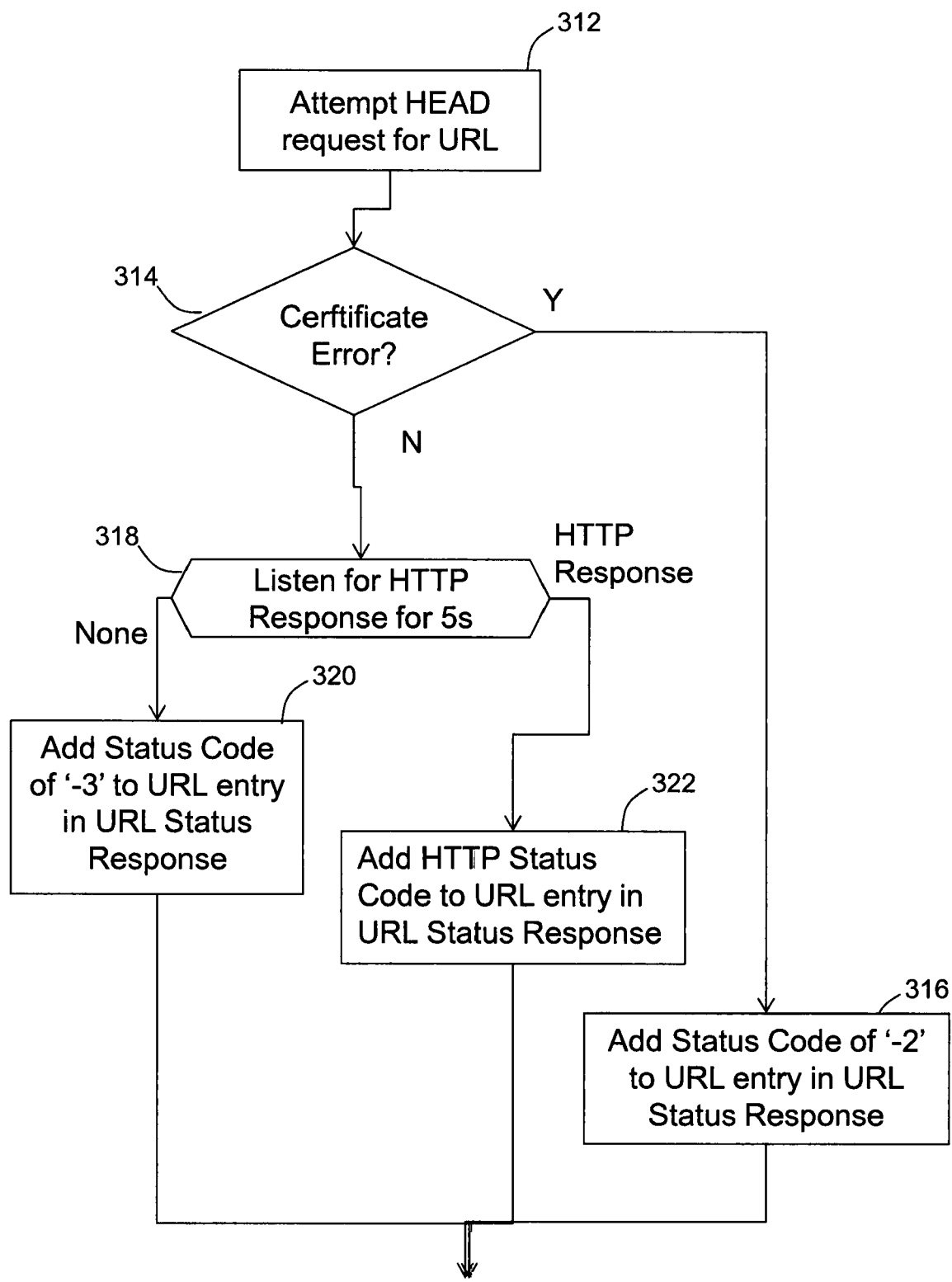
FIG. 12 is a flow-chart illustrating the detailed steps within the URL testing step of FIG. 11.

If the test 304 does not find a cache entry for the current URL, then the servlet controls the document server computer 14, 16 to carry out a URL testing process 308 which will now be described with reference to FIG. 12.

The URL testing process (FIG. 12) begins with attempting 314 to send a HEAD request in accordance with the HTTP protocol for the current URL. In cases where the URL's protocol is HTTPS, it is possible that the Java Virtual Machine comprised within the Apache Tomcat container running the servlet will raise an error on finding a problem with the certificate provided by the server of the resource identified by the URL under test. This error is handled 314 by adding 316 a status code of '−2' to the current URL entry. The error in the Transport Security Layer protocol which underlies HTTPS will mean that no HEAD request for the resource specified by the URL will be sent.

If the URL is an HTTP URL (i.e. begins http://) then no certificate error will arise, and the HEAD request will be sent to the URL. Similarly, if the URL is an HTTPS URL (i.e. begins with https://) and the necessary security requirements are met, then the HEAD request for the resource will be sent.

Using the HEAD request has the advantage of only fetching the header portion of the HTML file and thus saves on communications capacity. If a HEAD request is sent, then the servlet waits 318 for a response for five seconds (other time periods might be used). If an HTTP response is received, then the HTTP status code returned with the response is added 322 to the entry in the URL Status Response data structure for the current URL. If, on the other hand, no response is received in time then a status code of '−3' is added 320 to the entry in the URL Status Response data structure for the current URL.

Returning to FIG. 11, once the URL testing process has finished, a test 326 finds whether the status code in the current URL entry indicates whether following the URL was found to be problematic in the URL test 308. In general, status codes except 1xx, 2xx and 3xx are regarded as problematic. However, there are a few exceptions to this general rule. A 301 status code is considered problematic because it is a permanent redirect and indicates the page has permanently moved—hence it follows that the hyperlink URL is in error. A 401 status code (requesting credentials) is considered OK because the server can't log in for the end user. Another status code which is handled differently is a 503 status code (server temporarily unavailable). Where the HTTP response includes this status code, the URL is not cached since the situation is presumed to be a temporary one. If the URL was problematic then an entry for the current URL is added 328 to the Link Alerts data structure (FIG. 9).

Thereafter, or it the URL was not found to be problematic, a timestamp is added to the current entry, and the time-stamped entry is added 330 to the cache.

That brings the checking of the current URL to an end. At this point, a test 340 finds whether the last of the current batch of URLs has been processed. If not, the URL counter is incremented 342 and the URL check 303-330 is performed for the next URL in the batch.

If the test 340 finds that the last of the current batch of URLs has been processed, then the URL Status Response data structure is returned 344 to the personal computer 10,12. The hyperlink check (FIG. 11) then ends 346.

Returning now to FIG. 10, on receiving 214 the URL Status Response data structure the personal computer 10, 12, the continuing interpretation of the JavaScript causes the personal computer 10, 12 to run a procedure for altering 216 the display of the web-page on the screen 82.

As will be understood by those skilled in the art, client-side JavaScript provides programmatic access to a Document Object Model representing the web-page, and allows elements of the web-page to be altered without involving the document server computer 14,16. Pseudocode for the page display alteration procedure is presented below:

---

For each entry in the received URL Status Response data structure (Figure 7A or 7B)
 find corresponding hyperlink elements from map (created in step 207)
  for each hyperlink element
   if status code = −2 (i.e. there's a certificate error)
    add exclamation mark icon to link
    set rollover message to "security risk - certificate error!"
   else if status code = 503
    set rollover message to 'link status unknown as its server was too busy'
   else if status code = −3
    set rollover message to 'link status unknown as check took too long'
    else if (status !== 401 && status >= 400)
     reformat hyperlink by re-colouring it red, and striking it through
     set rollover message to 'link appears to be broken'
     else if (status !== 302 && status >= 300)
      set rollover message to 'link looks OK'
      else if (status === 302 || status >= 200)
       set rollover message to 'link verified'
       else set rollover message to 'link status unknown'
      endif
     endif
    endif
   endif
  endif
 endif
 endfor
endfor

---

The hyperlink checking and alerting process (FIG. 10) then tests 218 to find whether the batch of URLs checked by the document server computer 14, 16 is the final batch to be checked for the currently displayed web-page. If not, then the next batch of URLs in the URL to hyperlink associative array is send to the document server computer by creating a new Ajax Request object as described above. If all the URLs on the currently displayed web-page have been checked, then the process ends 220.

Figure 13:
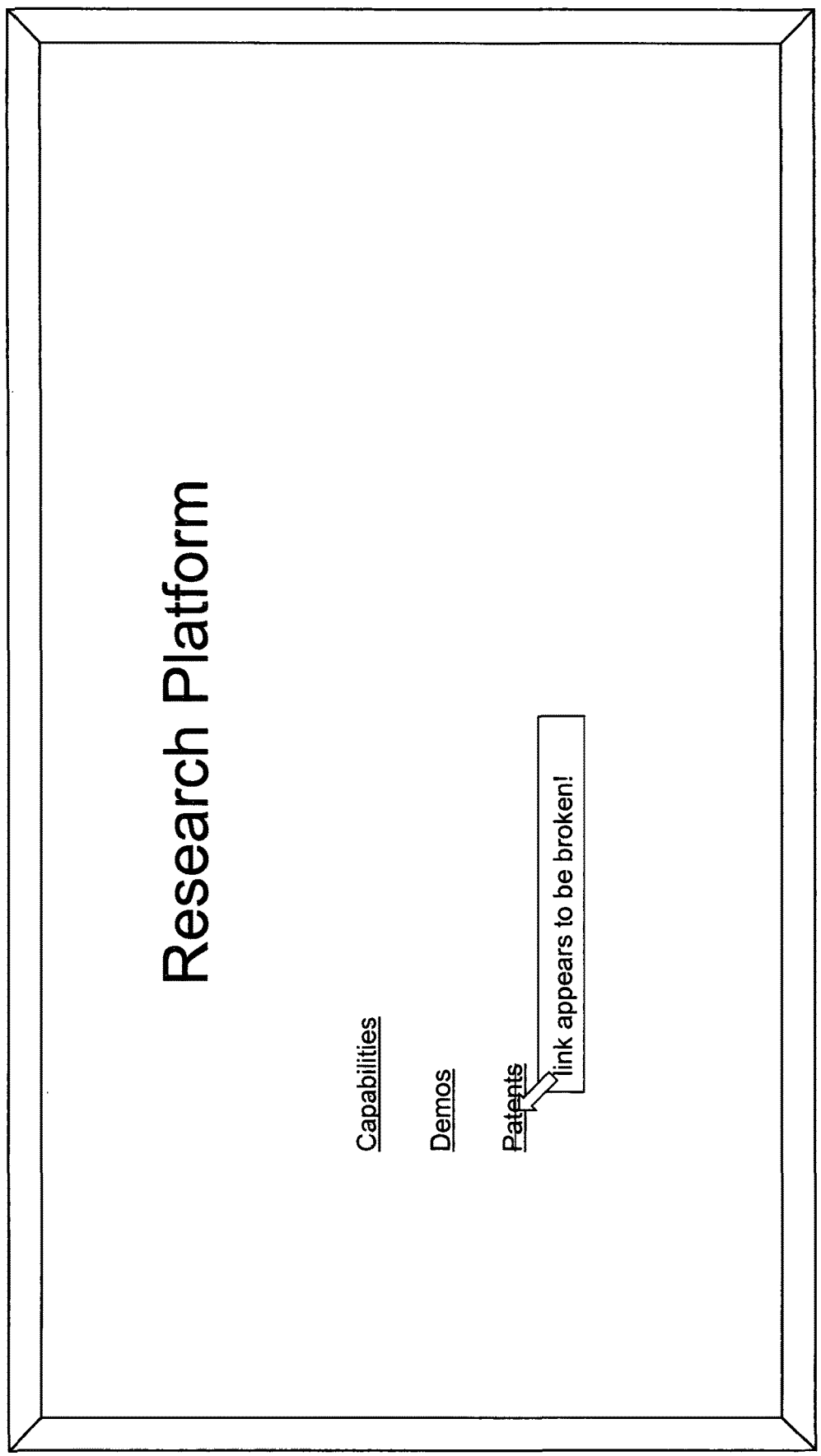
FIG. 13 illustrates the first hypertext document as modified by one of the personal computers following the identification of an availability fault in one of the hyperlinks included in that document.

A web-page which might be displayed on the screen 82 of the personal computer 10, 12 following receipt of the first HTML file, were that page to include the hyperlink fault seen in the first row of FIG. 9 is illustrated in FIG. 13. It will be seen how the user is discouraged from following the broken link, and hence how user dis-satisfaction with the research.intra.bt.com web-site is avoided.

Figure 14:
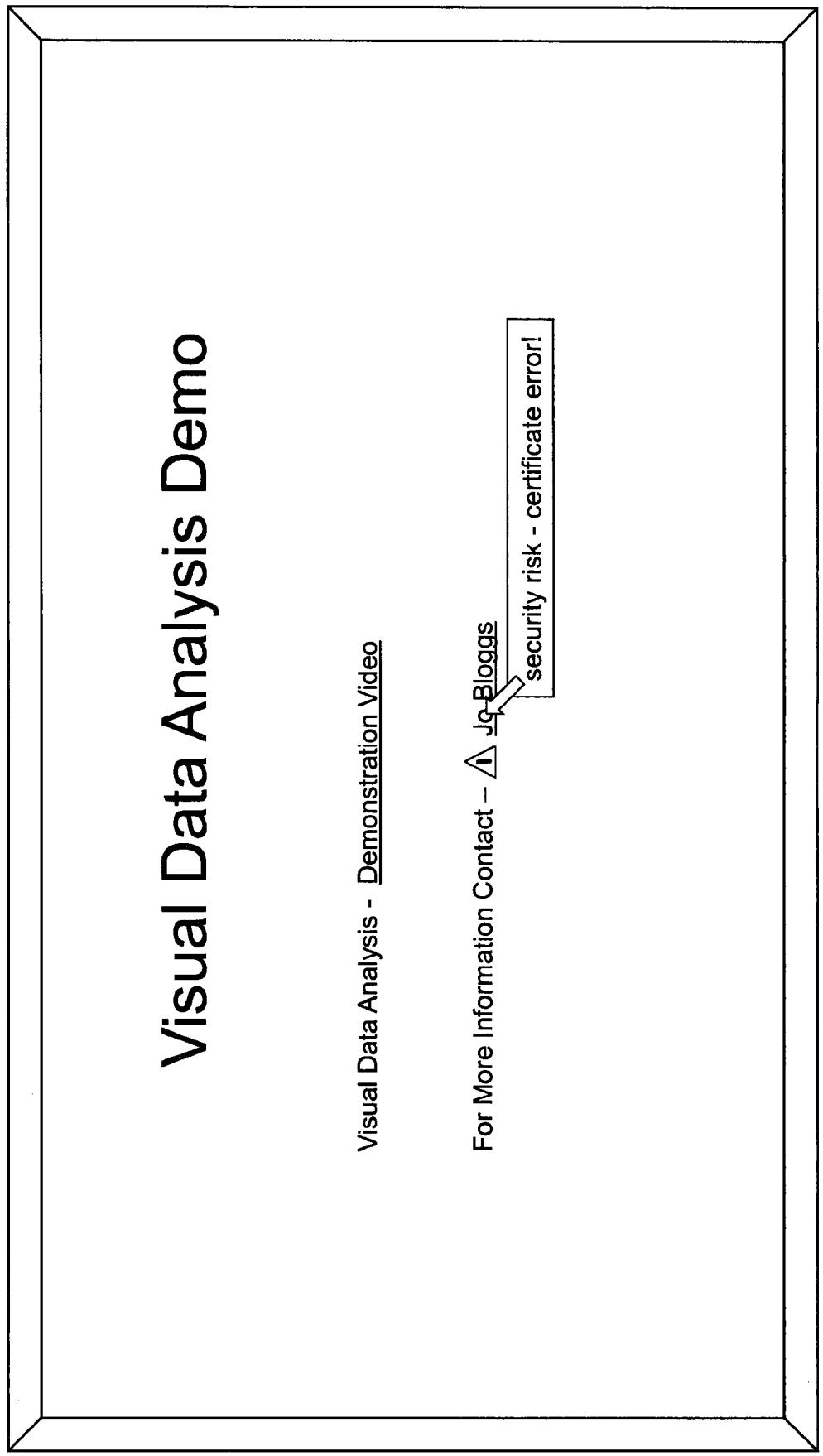
FIG. 14 illustrates the second hypertext document as modified by one of the personal computers following the identification of a security fault in one of the hyperlinks included in that document.

In a similar vein, a web-page which might be displayed on the screen 82 of the personal computer 10, 12 following receipt of the second HTML file, were that page to include the hyperlink fault seen in the second row of FIG. 9 is illustrated in FIG. 14. It will be seen how the user is alerted to the security risk prior to clicking on the link, and hence how the security of the distributed system is improved.

It will be seen how the above embodiment provides a link-checking service using commercially available browsers and webservers. The above embodiment achieves this, in part, by making use of a program written in a client-side scripting language embedded in the pages served by the document server. However, restrictions are placed on JavaScript and other client-side scripting languages which prevent programs written in those languages from accessing links to domains other than the domain which served the page. By having the client-side script control the user's personal computer to send a list of the links in the page back to the server, and having the server check the links, privacy issues are avoided (since the server's request will not include anything (e.g. a cookie) which will identify the request as having come from that particular user). It will further be seen how a server-side script is then used to check the submitted links and report back to the JavaScript program running in the browser, which alters the display of the web-page to highlight the broken links.

Many variations on the above described embodiments are possible, by way of example, these include:

i) in the above embodiment, two personal computers provided examples of client stations. However, in alternative embodiments, the cl ent stations could be smartphones, smart TVs, set-top boxes, tablets, any other interactive display device or a combination of different interactive display devices;

ii) in the above embodiment, the servlet and JavaScript programs were loaded from a CD-ROM, however, in other embodiments the programs might be downloaded from persistent storage on a networked computer;

iii) in the above embodiment, the references used the Hypertext Transfer Protocol, however other protocols such as the File Transfer Protocol might be used instead. Whilst a HEAD request couldn't be used in the latter instance, the File Transfer Protocol allows a computer to request the size of the file, and this could be used in place of the HEAD request to determine whether the link to the file was faulty or not.

iv) in the above embodiment, JavaScript was used to control the operation of the client station. In other embodiments, JavaScript could be replaced by other embedded code run by browser, e.g. ActionScript, JScript (and other ECMAScript compliant languages), VBScript, a Java Applet or an Active X control. Alternatively, the arrival of web-page could be used to trigger a program stored on client which could check whether the web-site is a participating web-site and carry out functionality of generating URL Status Request Message. The program could, for example, be a browser plug-in. In other embodiments the code could be included within the browser program itself. Both in the case of a plug-in, and where the required functionality is included within the browser code, the code would have access to the current page and could modify its appearance. Other advantages of such an embodiment are that the browser is able to cache the status of URLs between pages, and the browser could fall back to checking URLs itself if the checking-server became unavailable or too busy.

v) in alternative embodiments, the URL-checking code could be encapsulated in an "invisible" frame, another window or the body of a frameset containing just one frame. Using one of these would enable the browser to cache URL statuses between pages.

vi) the above embodiment involved URLs—references which identify the location of a resource and the name of that resource at that location. In other embodiments, a Uniform Resource Name URN is used instead in combination with some sort of directory offering one or more locations from which the resource can be fetched. More generally, embodiments could use resource names and corresponding directories in order to test whether a reference underlying a hyperlink could be followed.

vii) whilst HTML files were handled in the above embodiment, any file type which includes user-selectable references to other files could be handled in a similar way. One example is file which express content in accordance with the Portable Document Format.

viii) In the above embodiment, a servlet was used to provide the server-side functionality and the Apache JSery Protocol was used to provide communication between the webserver and servlet, but any programmatic platform could be used for the two programs, and different protocols could be used to provide communication between them. Alternatives include using a CGI script or ASP.NET or some other server-side technology. In other embodiments, the functionality could be provided by a plug-in for the webserver, or it could be included as part of the webserver program. In yet other embodiments the server-side functionality could be included in a script written in PHP (Hypertext PreProcessor).

ix) in place of HTML, other markup languages could be used—for example, in place of the HTML documents mentioned above, a document encoded in accordance with the Portable Document Format (containing a similar JavaScript program) could be used instead.

x) the above embodiment, when testing a URL which refers to a resource which requires the user to authenticate themselves, the server would receive a HTTP Status Code of 401;

xi) in the above embodiment, the personal computer extracted the URLs within the hyperlink elements in the HTML file, and sent the URLs to the document server computer for testing. In other embodiments, the personal computer could send the hyperlink elements to the document server, and the document server could return the hyperlink elements with an indication of whether they were broken, or could extract the URLs, test them, and return a notification similar to the one seen in FIGS. 7A and 7B;

xii) whilst in the above embodiment, each document server 14, 16 had its own cache, two or more document servers could share a cache;

xiii) whilst in the above embodiment, a visual indication of all faulty hyperlinks in a web-page was presented to the user, in other embodiments, only some of the faulty hyperlinks would be highlighted on the display—in particulars, in some embodiments, only faulty hyperlinks referencing other web-sites would be highlighted;

xiv) there are a myriad of ways in which a fault in a hyperlink might be indicated to a user—to give just a few examples, the colour could be changed, the text of the hyperlink might be struck through, an audible sound might be given on the cursor being moved over the hyperlink, an icon could be added to the hyperlink. In other embodiments, an indication might be added to those hyperlinks that are found to be O.K., with the display of faulty hyperlinks being unchanged;

xv) in some embodiments, the client station might await the results of the hyperlink test before displaying the received content item—in other words the first version of the content seen by the user includes one or more indications of the results of the hyperlink test.

xvi) in the above embodiment, the contert provided was a web-page. However, in other embodiments, the hyperlinks checked are generated by the execution of code received in a television signal in an interactive television system.

xvii) in the above embodiment, the document server checked the hyperlinks provided to it for checking. However, in other embodiments, the list of hyperlinks for checking might instead be provided to a different computer to the document server.

xviii) as a refinement of the above embodiment, a person skilled in the art would be able to provide JavaScript executable to determine whether a hyperlink is visible on the page and only add it to the associative array (FIGS. 6A and 6B) if it is. This is useful because sometimes parts of a webpage are hidden and only shown when needed—for example, when a particular browser is used: if there's a block of text (containing a hyperlink) that will only ever be displayed when Internet Explorer v6 is used, then there's little point in checking the URL of the hyperlink unless that block is displayed. Another example might be some embedded help that only pops up if requested, so the hyperlink isn't initially visible. It would also be possible (albeit mildly inefficient) to "poll" the page for new hyperlinks and check them as and when they become visible.

In summary of the above disclosure, a distributed system is disclosed in which one or more servers respond to requests for content including hyperlinks. Hyperlinks provide an interactive visual manifestation of an underlying reference to a resource. By using a graphical user interface provided by the device, a user is able to select a hyperlink, and thereby control the device to obtain the resource to which the underlying reference refers. However, if a user selects a hyperlink and the device is unable to follow the underlying reference to obtain the resource, user disappointment results. By arranging the server, on providing visual content including one or more hyperlinks, to attempt to follow the references underlying the hyperlinks, and to alter the appearance of any hyperlirk for which the underlying reference could not be followed, users are alerted to the likelihood that selecting the hyperlink will not lead to them obtaining the resource. In this way, user disappointment is avoided. The technique is of particular utility to web-site administrators.

What is claimed is:

1. A method of operating a distributed system comprising a content provision system and one or more client stations, said method comprising:
   operating said content provision system to execute a web server program at said content provision system, to serve a content item, which content item includes programming language instructions, to one or more of said client stations each of which has a display; and
   operating each of said client stations, to receive the content item and execute a web browser program to:
   a) render, on the display of said client station, received content with hyperlinks to other content; and
   b) execute the programming language instructions included in the received content item to cause said client station to:
      i) scan said content to extract a list of at least the references underlying the displayed hyperlinks; and
      ii) send the extracted list to said content provision system;
   said method further comprising:
   further operating said content provision system to receive said references sent by said one or more client stations and to check whether the resources to which the received references refer meet one or more criteria;
   operating said content provision system, responsive to said check finding that the resource does not meet said one or more criteria, to notify said client station that said content item includes deficient hyperlinks whose underlying reference refers to a resource which fails to meet said one or more criteria; and
   operating said client station to receive said notification, and, in response to said notification, display the content item along with an indication of the presence of one or more hyperlink faults in said content item.

2. A method according to claim 1 wherein said indication comprises a special presentation of each deficient hyperlink on the display of the client station.

3. A method of operating a content provision system, said method comprising:
   executing a web server program at said content provision system to serve a content item, which content item includes programming language instructions, to one of more client stations having a display for presentation by the client station to a user, presentation of said content item involving display of one or more hyperlinks on the display of the client station, the programming language instructions included within the content item being executable by the client station, on the occasion of the presentation of said content item on the display of the client station, to cause said client station to:
      i) scan said content item to generate a list of at least references underlying the displayed hyperlinks; and
      ii) send at least the references underlying said one or more hyperlinks to the content provision system;
   wherein said programming language instructions include a call to hyperlink checking software executable on said content provision system to check whether the resources to which the references refer meet one or more criteria, and
   the method further comprises notifying said client station that said content item includes deficient hyperlinks whose underlying reference refers to a resource which fails to meet said one or more criteria, said notification being provided to the working memory of the software process executing said received programming language instructions.

4. A method according to claim 3, further comprising, responsive to said check finding a deficient reference, logging the deficient reference.

5. A method according to claim 4, further comprising operating said content provision system, on checking a received reference, to check whether the results of a previous check of said reference are available, and to use the results of said previous check instead of re-checking the reference.

6. A method according to claim 3 in which said notification identifies each deficient hyperlink in said content item.

7. A client station for use in a distributed system comprising said client station and a content provision system, said client station including a hardware processor and a display and being arranged in operation to execute a web browser program to:
   i) receive a content item from a web server program executing on the content provision system, the content item including programming language instructions;
   ii) on a display of the client station, render received content with hyperlinks to other content;
   iii) execute the programming language instructions included in the received content item to cause said client station to:
      a) scan said content to extract a list of at least references underlying the displayed hyperlinks; and
      b) send the extracted list to said content provision system,
   wherein the client station is configured to:
   receive notification that said content item includes one or more deficient hyperlinks whose underlying reference refers to a resource which fails to meet one or more criteria, the notification being from said content provision system; and in response to receipt of the notification, display the content item along with an indication of one or more hyperlink faults in said content item.

8. A method of operating a client station in a distributed system comprising (i) said client station including a hardware processor and a display and configured to execute a web browser program and (ii) a content provision system configured to execute a web server program, said method comprising:
   i) receiving a content item from a web server program executing on the content provision system, the content item including programming language instructions;
   ii) on a display of said client station, rendering received content with hyperlinks to other content; and
   iii) executing the programming language instructions included in the content item to cause said client station to:
      a) scan the content item to extract a list of at least references underlying the displayed hyperlinks; and
      b) send the extracted list to said content provision system;
   wherein the method further comprises:
   receiving notification in the client station that said content item includes one or more deficient hyperlinks whose underlying reference refers to a resource which fails to meet one or more criteria, the notification being from said content provision system; and
   in response to receipt of the notification, displaying the content item along with an indication of one or more hyperlink faults in said content item.

9. A method according to claim 1 further comprising operating said content provision system, on checking a received reference, to check whether the results of a previous check of said reference are available, and to use the results of said previous check instead of re-checking the reference.

* * * * *